United States Patent
Akatsu et al.

(10) Patent No.: US 6,250,614 B1
(45) Date of Patent: Jun. 26, 2001

(54) VIBRATION INSULATING MOUNT

(75) Inventors: Yousuke Akatsu, Yokohama; Shigeki Satou, Chigasaki; Takeshi Kimura, Yokosuka; Kazushige Aoki, Isehara, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/263,685

(22) Filed: Mar. 5, 1999

(30) Foreign Application Priority Data

Mar. 6, 1998 (JP) .................................. 10-055254

(51) Int. Cl.⁷ ...................................................... F16F 5/00
(52) U.S. Cl. ................................................. 267/140.13
(58) Field of Search ...................... 267/140.13, 140.14, 267/140.15; 248/550

(56) References Cited

U.S. PATENT DOCUMENTS

| 5,273,263 | 12/1993 | Freudenberg et al. | 267/140.14 |
| 5,718,417 | 2/1998 | Aoki | 267/140.14 |
| 5,792,948 | * 8/1998 | Aoki | 73/116 |
| 5,947,456 | 9/1999 | Aoki | 267/140.14 |
| 5,950,756 | * 9/1999 | Satoh | 180/312 |
| 6,032,937 | * 3/2000 | Kojima | 267/140.14 |

FOREIGN PATENT DOCUMENTS

| 196 41 239 | 4/1997 | (DE) . |
| 0 528 111 | 2/1993 | (EP) . |
| 0 855 535 | 7/1998 | (EP) . |
| 9-250590 | 9/1997 | (JP) . |
| 10-252817 | 9/1998 | (JP) . |

OTHER PUBLICATIONS

Yosuke; "Vibration Control Supporting Device"; Patent Abstracts of Japan; vol. 1998, No. 01; Jan. 30, 1998; JP 09 257091;Sep. 30, 1997; Abstract.

Yosuke; "Vibro–Isolating Supporting Device"; Patent Abstracts of Japan; vol. 1998, No. 02; Jan. 30, 1998; JP 09 273585; Oct. 21, 1997; Abstract.

* cited by examiner

Primary Examiner—Christopher P. Schwartz
Assistant Examiner—C. T. Bartz
(74) Attorney, Agent, or Firm—Foley & Lardner

(57) ABSTRACT

A disclosed vibration insulating mount is promptly disposed between a vibrating body and a mounting body. The mount comprises a fluid chamber filled with a fluid, an elastic support partly defining the fluid chamber and mounting the vibrating body, a movable member partly defining the fluid chamber and capable of being displaced so as to change a volume of the fluid chamber, a supporting member supporting the movable member, and an actuator opposed to the movable member and generating displacing force to displace the movable member. Here, thickness of an outer portion of the movable member is thinner than that of an inner portion of the movable member.

11 Claims, 5 Drawing Sheets

VIBRATION INSULATING MOUNT

BACKGROUND OF THE INVENTION

This invention relates to a vibration insulating mount which mounts a vibration object such as an engine on a mounting body such as a vehicle body while isolating vibration and particularly to a vibration insulating mount in which a fluid chamber accommodating fluid is defined by a elastic support disposed between the vibrating body and mounting body so as to change a volume of the fluid chamber actively, thereby reducing vibration transmission rate.

Japanese Patent Application Laid-Open No. H9-250590 (Japanese Patent Application No. H8-59219) discloses a vibration insulating mount having a fluid chamber accommodating fluid so as to change a volume of the fluid chamber actively.

SUMMARY OF THE INVENTION

A conventional vibration insulating mount which changes a volume of a fluid chamber actively utilizes a movable member capable of being displaced so as to change the volume of the fluid chamber. According to a consideration by the present inventors, due to physical characteristics of an actuator for displacing the movable member, it is often difficult to keep the movable member parallel to the actuator. As a consequence, the movable member comes into contact with its peripheral members.

As its countermeasure, it can be considered to simply reduce the size of the movable member so as to expand a gap relative to the peripheral parts. However, if the size of the movable member is reduced, the change in the volume of the fluid chamber is also decreased. This is not favorable for the vibration insulation characteristic of the vibration insulating mount.

Generally in some cases, an electromagnetic actuator is used to displace the movable member and a part of the movable member is constituted of a magnetic path forming member so that a magnetic force is applied to the movable member. With such a structure as well, it is needless to say that if the size of the magnetic path forming member is reduced, it is possible to prevent the movable member from coming into contact with the peripheral members. However, if the size of the magnetic path forming member is simply reduced, the degree of the change in magnetic flux in a space is also reduced, and therefore the magnetic force applied to the movable member is also reduced. Such reduction of the magnetic force applied leads to deterioration of the vibration insulation mounting characteristic, and therefore it is not favorable.

Accordingly, it becomes apparent that a vibration insulating mount having a desired characteristic cannot be achieved only by reducing the size of the movable member.

The present invention has been achieved by such a consideration by the present inventors, and an object of the present invention is to provide a vibration insulating mount capable of exerting an active vibration insulation mounting characteristic stably and securely while preventing a generation of the abnormal sound which may occur between the movable member and its peripheral components.

To achieve the above object, the present invention provides a vibration insulating mount to be disposed between a vibrating body and a mounting body, and comprising a fluid chamber filled with a fluid, an elastic support partly defining the fluid chamber and mounting the vibrating body, a movable member partly defining the fluid chamber and capable of being displaced so as to change a volume of the fluid chamber, a supporting member supporting the movable member, and an actuator opposed to the movable member and generating displacing force to displace the movable member. Here, thickness of an outer portion of the movable member is thinner than that of an inner portion of the movable member.

In other words, the vibration insulating mount of the present invention comprising fluid accommodating means accommodating a fluid, elastic mounting means mounting the vibrating body and partly defining the fluid accommodating means, volume changing means changing a volume of the fluid accommodating means and partly defining the fluid accommodating means, supporting means supporting the volume changing means, and reducing means reducing a frequency of contact between the volume changing means and the supporting means.

DETAILED DESCRIPTION OF THE PREFERRED EMBODIMENTS

Hereinafter, the embodiments of the present invention will be described in detail with reference to the accompanying drawings.

First of all, a vibration insulating mount according to a first embodiment of the present invention will be described with reference to FIGS. 1–4.

Figure 1:
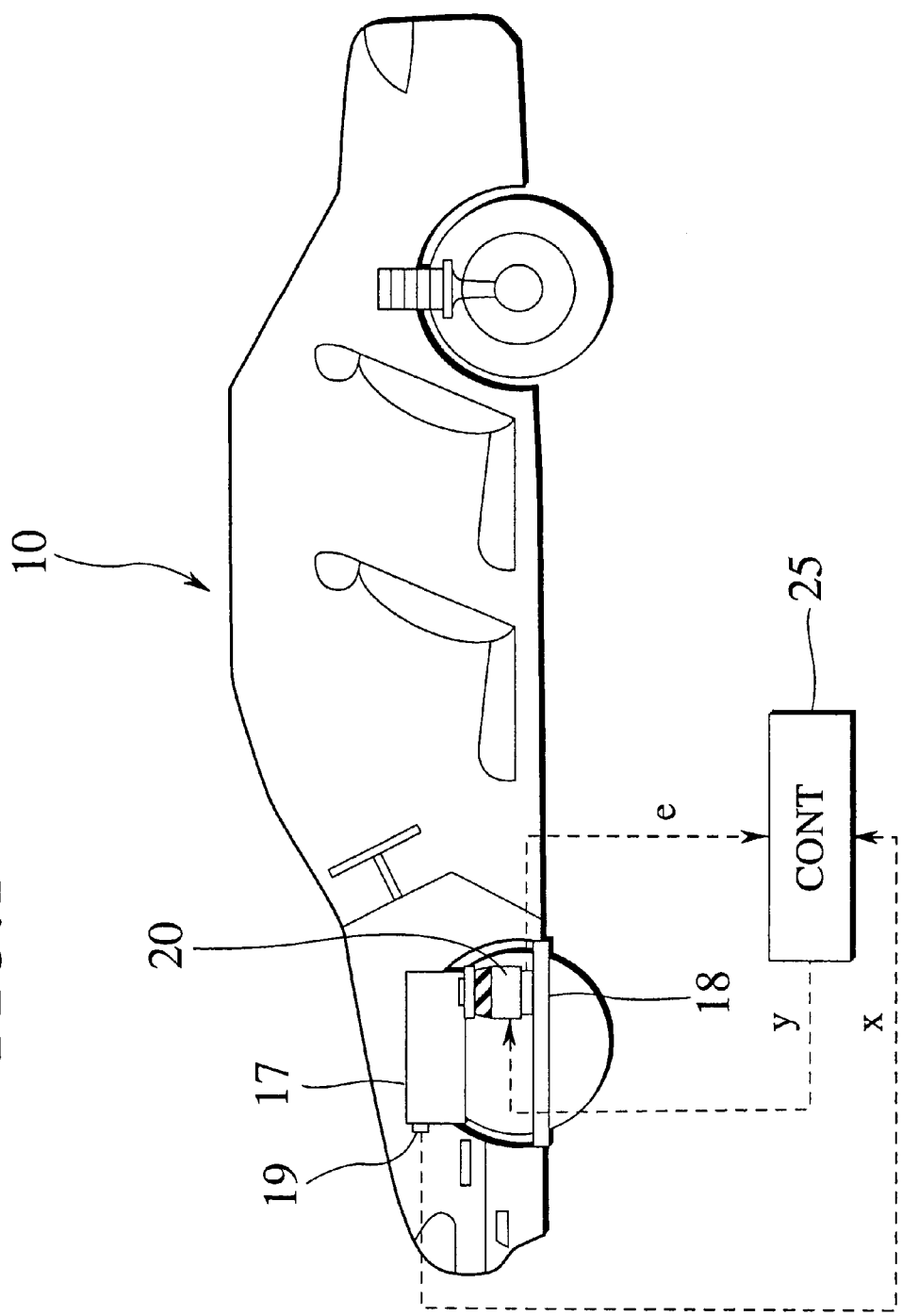
FIG. 1 is a schematic side view of a vehicle to which a vibration insulating mount according to a first embodiment of the present invention is applied.

As shown in FIG. 1, in a vehicle 10, an engine (vibrating body) 17 is mounted to a vehicle body (mounting body) 18 constituted of suspension members or the like through a vibration insulating mount (active engine mount) 20 capable of generating a force so as to reduce vibration transmitted from the engine 17 to the vehicle body 18 (which will be referred to as "active mounting force " hereinafter) in accordance with a drive signal. Actually, there are a plurality of engine mounts each of which generates passive mounting force depending on a relative displacement between the engine 17 and the vehicle body 18 in addition to the vibration insulating mount 20, between the engine 17 and the vehicle body 18. As the passive engine mount, for example, a normal engine mount for mounting a load with a rubber-like elastic body, a known fluid charging type mount insulator in which a fluid is charged inside of an elastic body such as a rubber so as to generate a damping force or the like are available.

Figure 2:
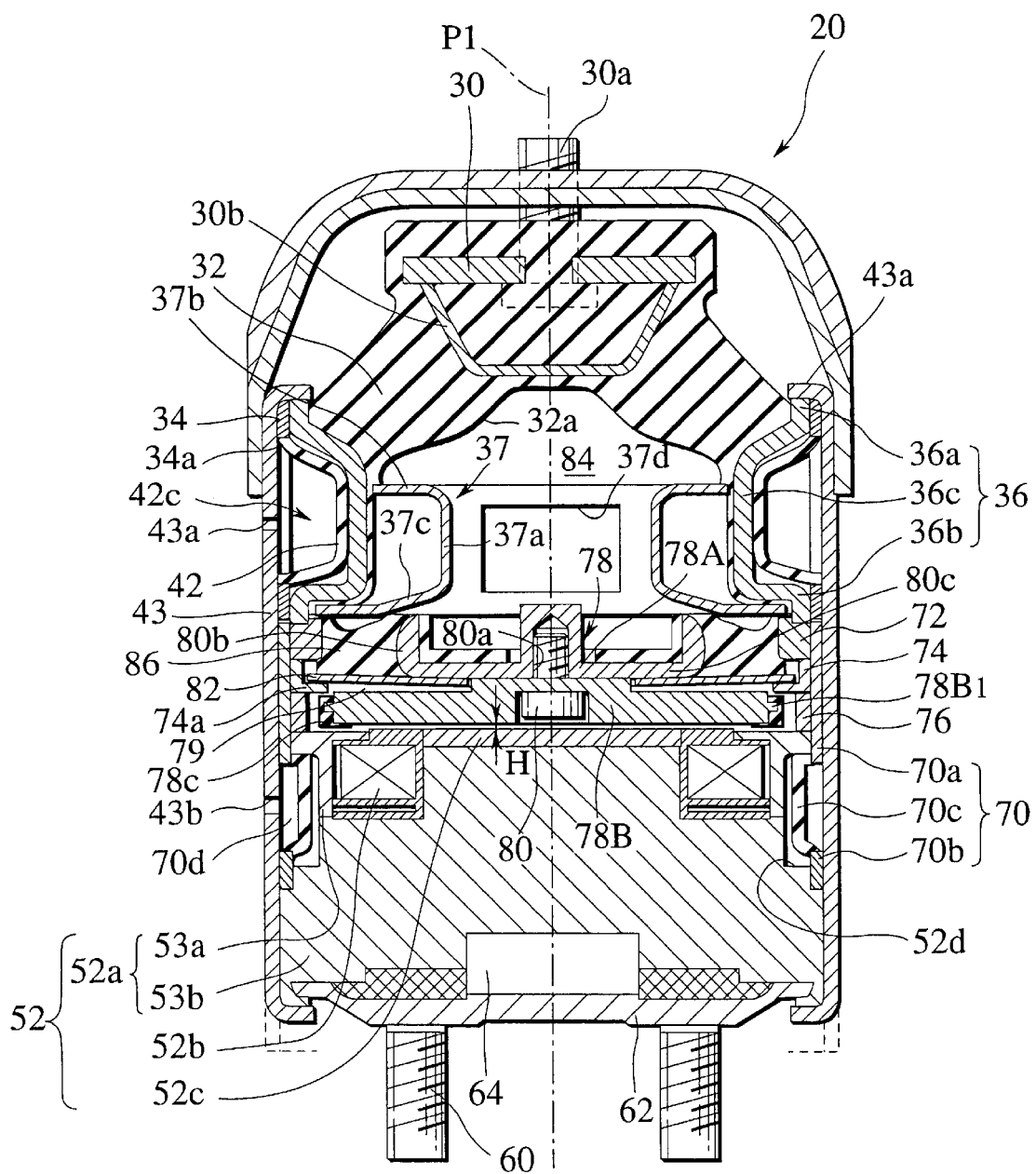
FIG. 2 is a sectional view of the vibration insulating mount according to the first embodiment.

FIG. 2 shows a structure of the vibration insulating mount 20. A device case 43 contains mount parts such as an outside cylinder 34, an orifice component 36, an inside cylinder 37, a elastic support 32 or the like. Below these mount parts, there are installed an electromagnetic actuator 52 which forms a part of partition wall of a main fluid chamber and displaces an elasticly mounted movable member in a direction in which a volume of the main fluid chamber is changed and a load sensor 64 which detects a vibration status of the vehicle body 18.

Namely, the vibration insulating mount 20 of this embodiment contains an engine side connecting member 30 in which a connecting bolt 30a is fixed such that it faces upward. Below this engine side connecting member 30 is fixed a hallow cylinder body 30b having an inverse trapezoidal section.

On a lower side of the engine side connecting member 30 is fixed the elastic support 32 by vulcanized adhering by use of curing agent so as to cover the surfaces of the lower side of the engine side connecting member 30 and the hallow cylinder body 30b. This elastic support 32 is a substantially cylindrical elastic body which is inclined gradually downward from its center portion toward its peripheral portion. A hallow portion 32a having a mountainous section is formed inside of the elastic support 32. A thin-shaped bottom end portion of the elastic support 32 is fixed by vulcanized adhering by use of curing agent with an inside peripheral surface of the orifice component 36 in which an axis center $P_1$ (hereinafter referred to as mount axis) is coaxial with respect to the hallow cylinder body 30b. Here, the mount axis $P_1$ is a central axis of the vibration insulating mount 20 and substantially corresponding to a vibrating body mounting direction (in this case, upward/downward direction in FIG. 2).

The orifice component 36 is a member in which a small-diameter cylinder portion 36c is formed continuously between a upper end cylinder portion 36a and a lower end cylinder portion 36b each having the same outside diameter so as to produce an annular concave portion on its outside surface. Although not shown, an opening portion is formed in the small-diameter cylinder portion 36c so that inside and outside of the orifice component 36 communicate with each other through this opening portion.

The outside cylinder 34 is fit to outside of the orifice component 36 and this outside cylinder 34 has the same inside diameter as the outside diameter of the upper end cylinder portion 36a and lower end cylinder portion 36b of the orifice component 36. The length in the axial direction of the outside cylinder 34 is the same as that of the orifice component 36. An opening portion 34a is formed in this outside cylinder 34. An outside periphery of a diaphragm 42 constituted of rubber made thin film elastic body is adhered to an edge portion of the opening portion 34a so as to close the opening portion 34a such that the diaphragm 42 is bent inward of the outside cylinder 34.

When the outside cylinder 34 having the above described structure is fit to outside of the orifice component 36 so as to surround the annular concave portion, an annular space is defined in the circumferential direction between the outside cylinder 34 and the orifice component 36 and then the diaphragm 42 is disposed in that annular space in a condition that it is bent as described above.

The inside cylinder 37 fit to inside of the orifice component 36 includes a smallest-diameter cylinder portion 37a formed to be smaller than the small-diameter cylinder portion 36c of the orifice component 36, and annular portions 37b and 37c are formed at upper and lower end portions of the smallest-diameter cylinder portion 37a so as to be directed outward in the diameter direction. The annular portion 37b at the upper end is formed such that the outside diameter thereof is slightly smaller than the small-diameter cylinder portion 36c of the orifice component 36. The annular portion 37c at the lower end is formed so as to be smaller than the lower end cylinder portion 36b of the orifice component 36, and a second opening portion 37d is formed in the smallest-diameter cylinder portion 37a.

As for the device case 43, an upper end caulking portion 43a having a circular opening portion having a diameter smaller than the outside diameter of the upper end cylinder portion 36a is formed at its upper end portion, and its main body continuous from this upper end caulking portion 43a has a cylinder shape extended up to its bottom end opening portion so as to have the same inside diameter as the outside diameter of the outside cylinder 34 (a shape indicated by broken lines at the bottom end opening portion in FIG. 2).

Then, the outside cylinder 34 in which the elastic support 32, the orifice component 36, the inside cylinder 37 and the diaphragm 42 are integrated therewith is inserted into inside of the device case 43 from its bottom end opening portion and by making the upper end portion of the outside cylinder 34 and the orifice component 36 into contact with a bottom surface of the upper end caulking portion 43a, they are disposed inside of the device case 43.

An air chamber 42c is defined in a space surrounded by the inside surface of the device case 43 and diaphragm 42. An air vent hole 43a is formed at a position facing this air chamber 42c, and the air chamber 42c communicates with the atmosphere through this air vent hole 43a.

A cylindrical spacer 70 is fit to a lower portion of the device case 43, a movable member 78 is disposed at an upper portion of this spacer 70, and an electromagnetic actuator 52 is disposed at a lower portion of the spacer 70.

That is, the spacer 70 is a member in which a diaphragm 70c constituted of a rubber made thin film elastic body is fixed between an upper cylindrical body 70a and a lower cylindrical body 70b by vulcanized adhering.

The electromagnetic actuator 52 comprises a cylindrical yoke 52a, a circular excitation coil 52b embedded at the side of an upper end surface of the yoke 52 and a permanent magnet 52c fixed to a upper center portion of the yoke 52a such that its poles are directed up and down. The aforementioned yoke 52a comprises an upper yoke member 53a and a lower yoke member 53b, which are two divisions thereof in the vertical direction in FIG. 2. Then, a lower circumference of the upper yoke member 53a and a upper circumference of the lower yoke member 53b are ground off so as to form a concave portion 52d continuous in its circumferential direction. Then, a diaphragm 70c of the spacer 70 is bent toward the aforementioned concave portion 52d. An air chamber 70d is defined in a space surrounded by an inner surface of the device case 43 and the diaphragm 70c, and an air vent hole 43b is formed at a position facing this air chamber 70d so that the air chamber 70d communicates with the atmosphere thorough this air vent hole 43b. A load sensor 64 is disposed between the bottom surface of the yoke 52a and a lid member 62 provided with vehicle side connecting bolts 60 so as to detect a residual vibration necessary for control to reduce vibration. Although as the load sensor 64, a piezoelectric element, magnetostrictor, strain gauge and the like are available, the piezoelectric element is used in this embodiment. A detection result of this sensor is supplied to a controller 25 as a residual vibration signal "e" as shown in FIG. 1.

On the other hand, a seal ring 72 for fixing a sealing member, a supporting ring 74 as a retainer having a spring supporting portion 74a formed along its inner peripheral surface so as to be projected inward for supporting a peripheral portion of a leaf spring 82 described later from down as a free end, and a gap holding ring 76 for setting a gap H between a yoke 52a of the electromagnetic actuator 52 and the movable member 78 are disposed coaxially with the mount axis $P_j$, and the movable member 78 is disposed within these rings such that it is displaceable in a vertical direction.

The movable member 78 comprises a partition wall forming member 78A formed in circular shape and a magnetic path forming member 78B formed in circular shape having a larger diameter than that of the partition wall forming member 78A. A bolt hole 80a is formed in the axis of the partition wall forming member 78A located at a far side with respect to the electromagnetic actuator 52. A movable member bolt 80 passes through the magnetic path forming member 78B located at a near side with respect to the electromagnetic actuator 52 and is screwed with the bolt hole 80a, so that the partition wall forming member 78A and magnetic path forming member 78B are integrated with each other.

A constricted portion 79 which is continuous like a ring (viz., an annular void or gap) is defined between the partition wall forming member 78A and the magnetic path forming member 78B. A leaf spring 82 which is an elastic member for supporting the movable member 78 elastically is accommodated in this constricted portion 79. That is, the leaf spring 82 is a disc-shaped member in which a hole is formed in the center thereof. An inner peripheral portion of this leaf spring 82 supports a center portion of the bottom side of the partition wall forming member 78A from lower side of the partition wall forming member 78A through a free end. An outer peripheral portion of the leaf spring 82 is supported by the spring supporting portion 74a of the supporting ring 74 from a lower side of the leaf spring 82 through a free end. Consequently, the movable member 78 is elastically supported by the device case 43 through the leaf spring 82.

In the partition wall forming member 78A, a partition wall portion 80c, which is thin and faces a fluid chamber 84, and an annular rib 80b which protrudes upward from an outer periphery of the partition wall portion 80c are formed. Then, the fluid chamber 84 is formed by a top face of the partition wall forming member 78, a bottom face of the elastic support 32 and an inside peripheral surface of the inside cylinder 37 so that fluid is contained in this fluid chamber 84. To prevent a leakage of the fluid from the fluid chamber 84 to the side of the constricted portion 79 accommodating the leaf spring 82, a sealing member 86 is provided between an outer periphery of the partition wall forming member 78A and an inner periphery of the seal ring 72. The aforementioned sealing member 86 is constituted of a ring-like or annular rubber elastic member and its elastic deformation allows the movable member 78 to be displaced vertically relative to the seal ring 72 and the device case 43 in FIG. 2.

Figure 3:
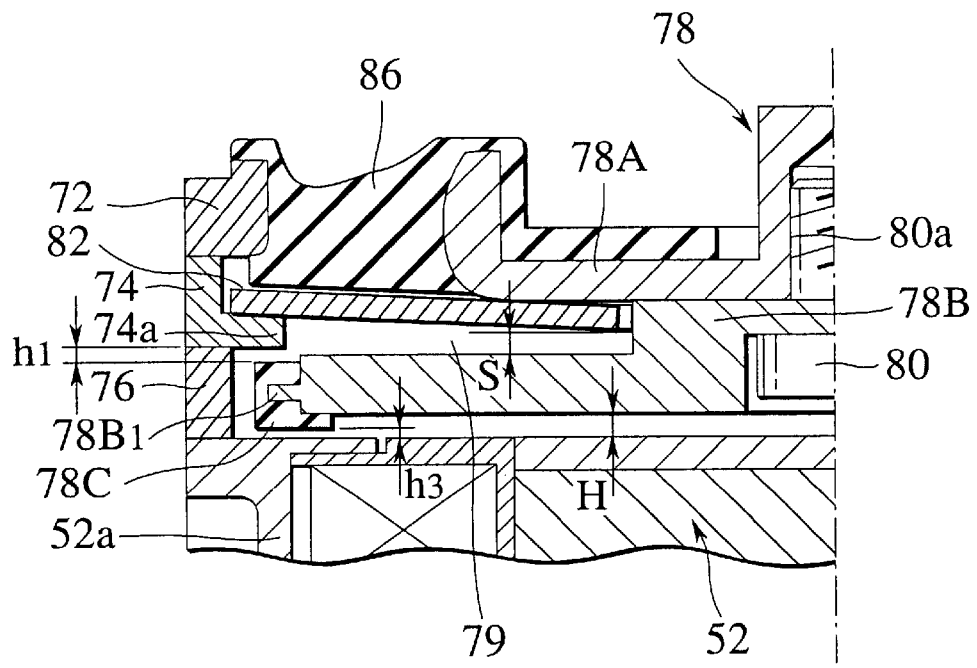
FIG. 3 is a partial sectional view showing a structure of an outer peripheral portion of a movable member of the vibration insulating mount of the first embodiment.

As shown in FIG. 3, a thin annular portion $78B_1$ having a smaller thickness than the magnetic path forming member 78B is formed on an outer peripheral portion of the magnetic path forming member 78B such that it is projected outward in the diameter direction. Upper and lower faces of this thin annular portion $78B_1$ are disposed so as to oppose each other so that they are located between the spring supporting portion 74a of the supporting ring 74 and the yoke 52a of the electromagnetic actuator 52. It is so constructed that a thick portion of the magnetic path forming member 78B does not overlap the spring supporting portion 74a in a perpendicular direction (vertical direction in the Figure), so that if the movable member 78 moves largely upward in the Figure, the thin annular portion 78B, comes into contact with the leaf supporting portion 74a.

A stopper member 78C which is made of a ring-like, rubber-like elastic body for preventing a direct contact with the spring supporting portion 74a and yoke 52a when the movable member 78 moves excessively is fixed to the aforementioned thin annular portion $78B_1$ in a condition that it covers upper and lower faces of the thin annular portion $78B_1$ and an outer peripheral end of the thin annular portion $78B_1$.

In this embodiment, an inner periphery around the hole of the leaf spring 82 is the nearest the magnetic path forming member 78B. If a distance at a position where the leaf spring 82 is the nearest the magnetic path forming member 78B is S (see FIG. 3), a distance hi between the upper face of the aforementioned stopper member 78C and the spring supporting portion 74a of the supporting ring 74 when the electromagnetic actuator 52 is not activated, that is, the movable member 78 is attracted by only magnetic force of the permanent magnet 52c is set so as to be smaller than the aforementioned distance S ($h_1$<S).

Further, if a gap between a bottom face of the magnetic path forming member 78B and the yoke 52a of the electromagnetic actuator 52a is H, a gap $h_3$ between a bottom face of the stopper member 78C and the yoke 52a of the electromagnetic actuator 52 is set so as to be smaller than the gap H ($h_3$<H), so that the stopper member 78C is nearer the yoke 52a than the bottom face of the magnetic path forming member 78B.

In the mean time, the excitation coil 52b of the electromagnetic actuator 52 generates a predetermined electromagnetic force depending on a driving signal "y" which is a current supplied from the controller 25 shown in FIG. 1. The controller 25 comprises a microcomputer, necessary interface circuit, A/D converter, D/A converter, amplifier, memory medium such as ROM and RAM or the like, and generates and outputs the driving signal "y" to the vibration insulating mount 20 so as to produce an active mounting force in the vibration insulating mount 20 for reducing the vibration generated by the engine 17.

In the case of reciprocating 4-cylinder, 4-cycle engine, for example, the idling vibration or the indistinct sound vibration generated from the engine 17 are produced mainly because engine vibration which is a so-called engine revolution secondary component is transmitted to the vehicle body 18. Thus, if the driving signal "y" is produced synchronously with that engine revolution secondary component, the vibration of the vehicle body 18 can be reduced. Therefore, according to this embodiment, a pulse signal generator 19 which produces an impulse signal synchronously with a rotation of a crank shaft of the engine 17 (e.g., in the case of the reciprocating 4-cylinder engine, an impulse signal is produced every rotation by 180° of the crank shaft) and outputs as a reference signal "x" is provided, and that reference signal "x" is supplied to the controller 25.

The controller 25 executes so-called synchronous Filtered XLMS algorithm which is a sequentially renewal-type adaptive algorithm based on the residual vibration signal "e" and reference signal "x" so as to calculate the driving signal "y" to the vibration insulating mount 20 and output that driving signal "y" to the vibration insulating mount 20.

Speaking concretely, the controller 25 has an adaptive digital filter W capable of varying a filter coefficient $W_i$ (i=0, 1, 2, ..., I–1: I is tap number) and, from the time when a current reference signal "x" is input, the controller 25 outputs the filter coefficient $W_i$ of the adaptive digital filter W at a predetermined sampling clock interval as the driving signal "y". On the other hand, the controller 25 executes a processing for renewing the filter coefficient $W_i$ of the adaptive digital filter W based on the reference signal "x" and residual vibration signal "e".

The renewal formula of the adaptive digital filter W is expressed in the form of an formula based on the Filtered-X LMS algorithm.

$$W_i(n+1)=W_i(n)-\mu R^T e(n)$$

Wherein, terms with (n), (n+1) respectively indicate values at the time of sampling time n, n+1, and $\mu$ is a convergence coefficient. Further, theoretically, the renewing reference signal $R^T$ is a value obtained by filter processing with respect to the reference signal "x" with a transmission function filter C^ which is obtained by modeling a transmission function C between the electromagnetic actuator 52 and the load sensor 64 of the vibration insulating mount 20 by use of a finite impulse response-type filter. Since the magnitude of the reference signal "x" is "1", the value of the renewing reference signal $R^T$ coincides with a sum of the impulse response waveforms at the sampling time n when the impulse response of the transmission function filter C^ is generated in sequential synchronously with the reference signal "x". Although, theoretically, the reference signal "x" is filtered with the adaptive digital filter W so as to generate the driving signal "y", since the magnitude of the reference signal "x" is "1", even if the filter coefficient $W_i$ is output in sequential as the driving signal "y", the same result is obtained as when the result of the filtering processing is used as the driving signal "y".

Next, an operation of the vibration insulating mount of this embodiment will be described.

That is, in a condition in which the idling vibration or the indistinct sound vibration is generated from the engine 17, the filter coefficient $W_i$ of the adaptive digital filter W is supplied in sequential as the driving signal "y" to the electromagnetic actuator 52 of the vibration insulating mount 20 from the controller 25, at the predetermined sampling clock interval from the time when the reference signal "x" is input.

As a result, a magnetic force is generated in the excitation coil 52c corresponding to the driving signal "y". Then, it can be considered that that magnetic force from the excitation coil 52c strengthens or weakens the magnetic force of the permanent magnet 52c because the magnetic path forming member 78B has been already applied with a certain level of the magnetic force by the permanent magnet 52c. That is, when no driving signal "y" is supplied to the excitation coil 52b, the movable member 78 including the magnetic path forming member 78B is displaced at a position in which a supporting force of the leaf spring 82 is balanced with the magnetic force of the permanent magnet 52c. Then, when the driving signal "y" is supplied to the excitation coil 52b in this neutral state and the magnetic force generated in the excitation coil 52b by the driving signal "y" is opposite to the magnetic force of the permanent magnet 52c, the movable member 78 is displaced in a direction in which the gap relative to the electromagnetic actuator 52 is increased. On the contrary, if the magnetic force generated in the excitation coil 52b is in the same direction as the magnetic force of the permanent magnet 52c, the movable member 78 is displaced in a direction in which the gap relative to the electromagnetic actuator 52 is decreased.

As described above, the movable member 78 can be displaced in both ways. If the movable member 78 is displaced, the partition wall forming member 78A forming a part of the partition wall of the fluid chamber 84 is also displaced, so that the volume of the fluid chamber 84 is changed. Due to the change of the volume, the so-called expansion spring of the elastic support 32 is changed. Thus, the active mounting force in both positive and negative directions is generated in the vibration insulating mount 20.

Because the magnetic path forming member 78B for receiving magnetic force is extended in the diameter direction thereof to such an extent that the magnetic path forming member 78B does not come into contact with anything when it moves upward and the thin annular portion $78B_1$ is projected in the diameter direction thereof, the entire surface area of the magnetic path forming member 78B can be increased. Further, because the thickness of the thin annular portion $78B_1$ is smaller than the thickness of the magnetic path forming member 78B, the movable member 78 does not come into contact with the supporting ring 74 when the movable member 78 moves at an ordinary stroke. Each filter coefficient $W_i$ of the adaptive digital filter Which generates the driving signal "y" is renewed sequentially according to the aforementioned formula based on the synchronous Filtered-X LMS algorithm. Therefore, after a certain time has been passed and each filter coefficient $W_i$ of the adaptive digital filter W is converged to an optimum value, by supplying the driving signal "y" to the vibration insulating mount 20, the idling vibration or the indistinct sound vibration which is transmitted from the engine 17 to the vehicle body 18 through the vibration insulating mount 20 is reduced.

Figure 4:
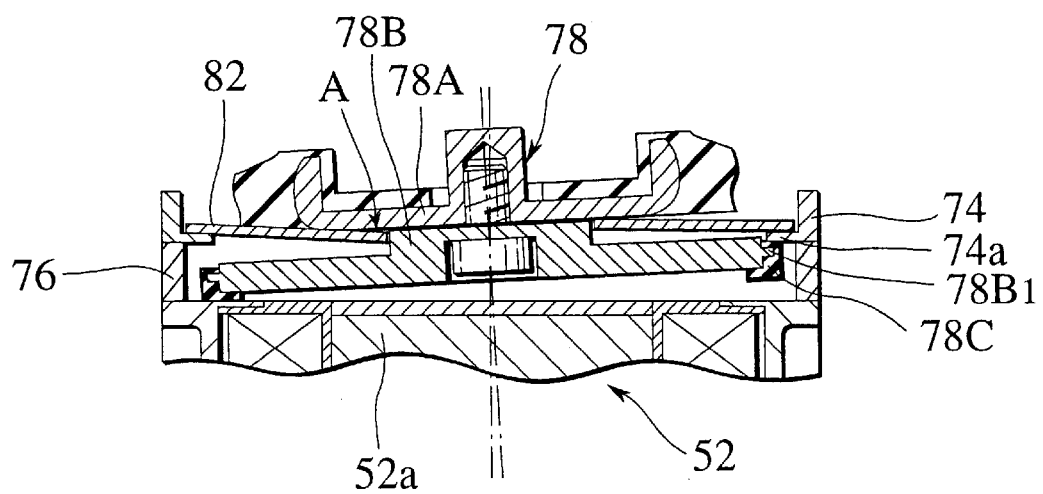
FIG. 4 is a partial sectional view showing a structure of the movable member when it is inclined of the vibration insulating mount of the first embodiment.

Thereupon, FIG. 4 shows a case in which when the movable member 78 is attracted by the electromagnetic actuator 52, the movable member 78 is largely inclined because of inequality of electromagnetic force in the circumferential direction and/or inequality of spring constant of the leaf spring 82 in the circumferential direction.

At this time, a top inclined portion (right edge portion of the movable member 78 in FIG. 4) of the outer peripheral portion of the movable member 78 comes near a bottom face of the spring supporting portion 74a of the supporting ring 74. Because in this embodiment, there is provided a large distance between the thin annular portion $78B_1$ projected in the convex shape outward in the diameter direction from the outer peripheral portion of the magnetic path forming member 78B and the spring supporting portion 74a, the frequency of contact between the magnetic path forming member 78B and spring supporting portion 74a can be reduced. When the magnetic path forming member 78B comes into contact with the spring supporting portion 74a, no abnormal sound is generated because the stopper member 78C fixed around the thin annular portion $78B_1$ exists between the thin annular portion $78B_1$ and the spring supporting portion 74a.

A bottom inclined portion (left edge portion of the movable member 78 in FIG. 4) of the outer peripheral portion of the movable member 78 comes near the top face of the yoke 52a. Because a large gap is defined between the thin annular portion $78B_1$ of the magnetic path forming material 78B and yoke 52a, the frequency of contact between the magnetic path forming member 78B and yoke 52a can be reduced.

When the magnetic path forming member 78 comes into contact with the yoke 52a, no abnormal sound is generated because the stopper member 78C fixed around the thin annular portion 78B$_1$ exists between the thin annular portion 78B$_1$ and yoke 52a.

When the magnetic path forming member 78B is inclined, there is a fear that, as shown by the symbol A in FIG. 4, the leaf spring 82 may come into contact with the top face of the magnetic path forming member 78B and an abnormal sound may be generated. However, according to this embodiment, because the distance h, between the top face of the stopper member 78C and the spring supporting portion 74a of the supporting ring 74 is set so as to be smaller than the distance S between the leaf spring 82 and the magnetic path forming member 78B when they are nearest each other ($h_1 < S$), the stopper member 78C comes into contact with the spring supporting portion 74a first thereby preventing the leaf spring 82 from coming into contacting with the top face of the magnetic path forming member 78B so as to prevent a generation of the abnormal sound.

If an internal pressure of the fluid chamber 84 changes largely so that the movable member 78 moves excessively in the vertical direction, the thin annular portion 78B$_1$ and the spring supporting portion 74a of the supporting ring 74a act as a stopper so as to inhibit further movement of the movable member 78. Thus, it is possible to avoid a problem that the rib 80b collides with the internal cylinder 37 to produce a damage.

According to this embodiment, even if the diameter of the magnetic path forming member 78B is not reduced and the entire thickness thereof is not reduced, a direct contact of the magnetic path forming member 78B relative to the spring supporting portion 74a of the supporting ring 74 and the top face of the yoke 52a can be prevented. Therefore, it is possible to provide a vibration insulating mount 20 in which a generation force of the electromagnetic actuator 52 is not reduced and having a stable vibration insulation characteristic.

Because the stopper member 78C made of rubber like elastic body according to this embodiment is fixed around the periphery of the thin annular portion 78B$_1$ projected in the convex shape outward in the diameter direction, the stopper member 78C is formed in such a manner that the volume of its upper portion which may be in contact with the spring supporting portion 74a of the supporting ring 74 and the volume of its lower portion which may be in contact with the top face of the yoke 52a are efficiently increased. As a result, if the spring supporting portion 74a and the yoke 52a comes into contact with the stopper member 78C repeatedly, this portion having the increased volume of the stopper member 78C is capable of keeping its elastic deformation for a long time, so that the durability and wear resistance of the stopper member 78C are efficiently improved.

Because the stopper member 78C is fixed continuously from its upper portion to its lower portion just as if it wraps entirely the thin annular portion 78B$_1$, the fixing force of the stopper member 78C with respect to the magnetic path forming member 78B is increased.

Although according to this embodiment, the thin annular portion 78B$_1$ is formed in a step shape so that it is projected outward, it may be structured in such a manner that the thickness is gradually reduced linearly from inside to outside, that is a tapered shape is formed.

Next, a vibration insulating mount according to a second embodiment of the present invention will be described with reference to FIG. 5.

The vibration insulating mount according to this embodiment basically has the same structure as the first embodiment except that the structure of the magnetic path forming member is different. Thus, the same reference numerals are attached to the same components and a description on the same structure and processing is omitted.

Figure 5:
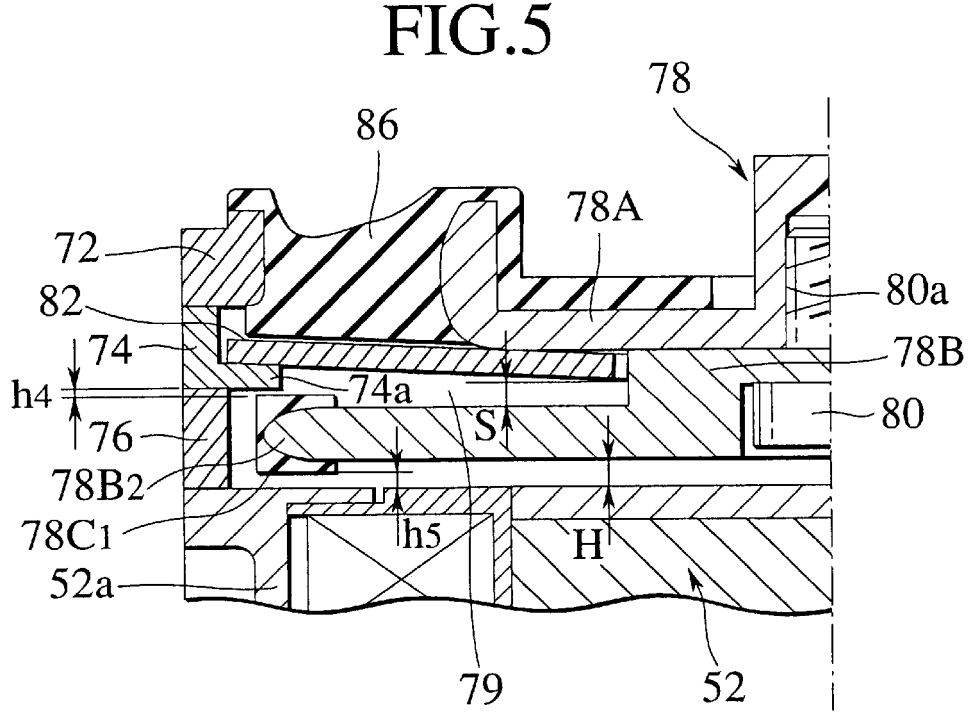
FIG. 5 is a partial sectional view showing a structure of the outer peripheral portion of the movable member of the vibration insulating mount of a second embodiment.

As shown in FIG. 5, the outer peripheral portion of the magnetic path forming member 78B of this embodiment is formed as a thin annular portion 78B$_2$ which is gradually thinned outward in the diameter direction while curved. The upper and lower curved faces of this thin annular portion 78B$_2$ respectively oppose the spring supporting portion 74a of the supporting ring 74 and the yoke 52a of the electromagnetic actuator 52 with a large gap. A stopper member 78C, made of ring-like, rubber-like elastic body is fixed to the aforementioned thin annular portion 78B$_2$ in a condition that it covers the upper and lower curved faces of the thin annular portion 78B$_2$ in order to prevent a direct contact of the thin annular portion 78B$_2$ with the spring supporting portion 74a and yoke 52a.

If a gap between the leaf spring 82 and magnetic path forming member 78B when they are the nearest each other is assumed to be S in this embodiment, a distance $h_4$ between the upper face of the stopper member 78C$_1$ and spring supporting portion 74a of the supporting ring 74 is set to a value smaller than the aforementioned distance S ($h_4 < S$). A gap $h_5$ between the lower face of the stopper member 78C$_1$ and yoke 52a of the electromagnetic actuator 52 is set to be value smaller than a gap H between the lower face of the magnetic path forming member 78B and yoke 52a of the electromagnetic actuator 52 ($h_5 < H$), so that the stopper member 78C$_1$ is nearer the yoke 52a than the lower face of the magnetic path forming member 78B is.

Even if the movable member 78 having the magnetic path forming member 78B of the aforementioned structure is inclined, because the thin annular portion 78B$_2$ which is gradually thinned outward in the diameter direction while curved defines a large gap relative to the spring supporting portion 74a, the frequency of a contact between the magnetic path forming member 78B and spring supporting portion 74a can be reduced. If the magnetic path forming member 78B comes into contact with the spring supporting portion 74a, no abnormal sound is produced because the stopper member 78C$_1$ fixed around the thin annular portion 78B$_2$ (upper and lower faces, and outer peripheral end face) exists between the thin annular portion 78B$_2$ and spring supporting portion 74a. Further, because there is a large gap defined between the thin annular portion 78B$_2$ and yoke 52a, the frequency of the contact between the magnetic path forming member 78B and yoke 52a can be reduced. If the magnetic path forming member 78B comes into contact with the yoke 52a, no abnormal sound is produced because the stopper member 78C$_1$ fixed around the thin annular portion 78B$_2$ exists between the thin annular portion 78B$_2$ and yoke 52a. Further, in this embodiment, the distance $h_4$ between the upper face of the stopper member 78C$_1$ and spring supporting portion 74a of the supporting ring 74 is set to be a value smaller than the distance S between the leaf spring 82 and magnetic path forming member 78B when the leaf spring 82 is the nearest the magnetic path forming member 78B ($h_4 < S$), so that the stopper member 78C$_1$ comes into contact with the spring supporting portion 74a so as to prevent a contact between the leaf spring 82 and magnetic path forming member 78B, and therefore a generation of the abnormal sound is prevented.

As described above, according to this embodiment, it is possible to prevent a direct contact of the magnetic path forming member 78B with the spring supporting portion 74a of the supporting ring 74 and upper face of the yoke 52a, even if the diameter of the magnetic path forming member 78B is not reduced and the entire thickness of the magnetic path forming member 78B is not reduced, like the first embodiment. Thus, in this embodiment also, it is possible to provide a vibration insulating mount 20 in which a generation force of the electromagnetic actuator 52 is not reduced and having a stable vibration insulation control characteristic.

Next, a vibration insulating mount according to a third embodiment of the present invention will be described with reference to FIG. 6.

The vibration insulating mount of this embodiment basically has the same structure as the first embodiment except that the structure of the supporting ring is different from the first embodiment. Thus, the same reference numerals are attached to the same components and processing, and a description thereof is omitted.

Figure 6:
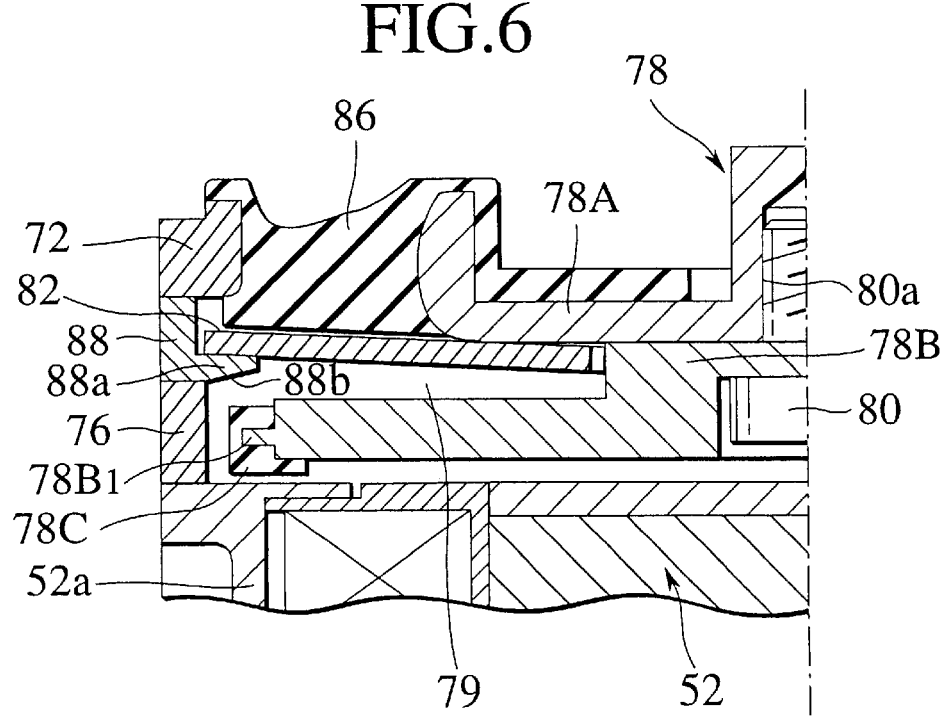
FIG. 6 is a partial sectional view showing a structure of a supporting ring of a vibration insulating mount according to a third embodiment of the present invention.

As shown in FIG. 6, in the supporting ring 88 of this embodiment, a spring supporting portion 88a formed to be projected in a convex shape from the inner peripheral portion supports the outer peripheral portion of the leaf spring 82 through its upper face as a free end from below and the lower face of the spring supporting portion 88a is formed as an inclined face 88b which gradually departs from the outer peripheral portion of the magnetic path forming member 78B as the inclined face 88b goes inward in the diameter direction.

The distance between the thin annular portion $78B_1$ and inclined face 88b is further increased because of the provision of the supporting ring 88 having the above structure. Thus, even if the movable member 78 is inclined and displaced, the frequency of the contact between the magnetic path forming member 78B and spring supporting portion 88a is further reduced. The inclined surface 88b and the thin annular portion 78B1, can be, due to the space therebetween which is self-evident from FIG. 6, taken as defining a part of a means for reducing the frequency of contact between the magnetic path forming member and the spring support portion 74a. Therefore, it is possible to provide a vibration insulating mount which prevents the abnormal sound which may be produced between the spring supporting portion 88a of the supporting ring 88 and magnetic path forming member 78B and has a stable vibration insulation control characteristic without reducing a generation force of the electromagnetic actuator 52.

Although in this embodiment, the distance between the thin annular portion $78B_1$ and magnetic path forming member 78B is increased by the linear inclined face 88b, it is permissible to use a stepped face instead of the linear face.

Next, a vibration insulating mount according to a fourth embodiment of the present invention will be described with reference to FIG. 7.

The vibration insulating mount of this embodiment basically has the same structure as the first embodiment except that the structure of the supporting ring is different from the first embodiment. Thus, the same reference numerals are attached to the same components and processing, and a description thereof is omitted.

Figure 7:
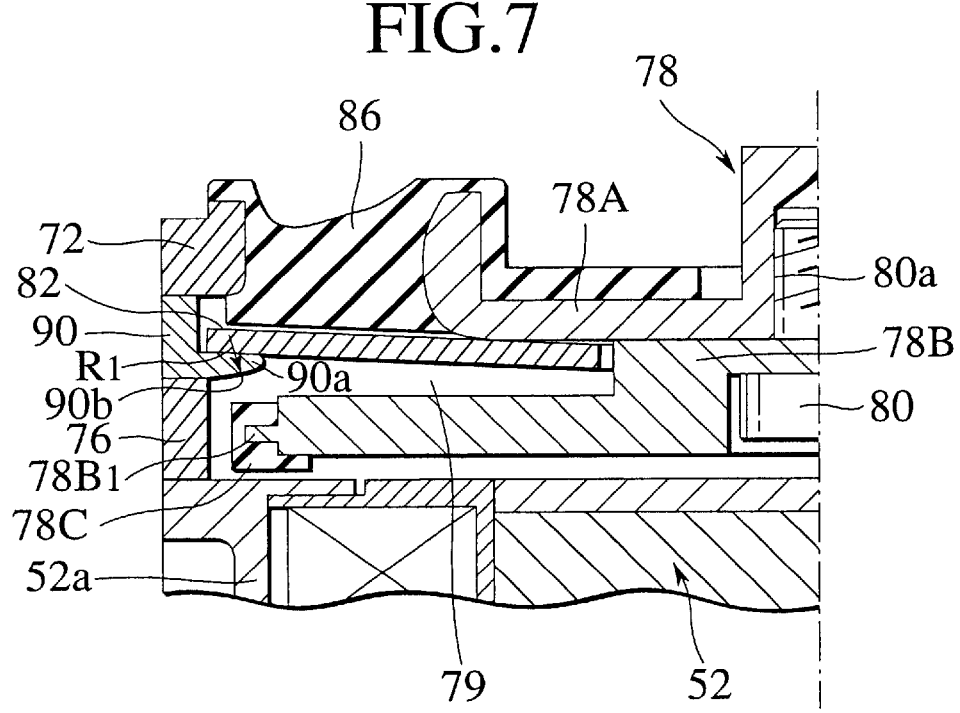
FIG. 7 is a partial sectional view showing a structure of the supporting ring of the vibration insulating mount according to a fourth embodiment of the present invention.

As shown in FIG. 7, in the supporting ring 90 of this embodiment, a spring supporting portion 90a formed to be projected in a convex shape from the inner peripheral portion supports the outer peripheral portion of the leaf spring 82 through its upper face as a free end from below and the lower face of the spring supporting portion 90a is formed as a curved face 90b which is curved in a convex shape at a predetermined curvature radius $R_1$ toward the magnetic path forming member 78B.

The distance between the thin annular portion $78B_1$ and curved face 90b is increased because of the provision of the supporting ring 90 having such a structure and thus becomes part of an arrangement which includes the thin annular portion 78B1, and which can, due to the clearance which is self-evident in FIG. 7, be considered as part of a means for reducing the frequency of contact between the magnetic path forming member and the supporting portion 90a even if the movable member 78 is inclined and displaced, the frequency of the contact between the magnetic path forming member 78B and spring supporting portion 90a is further reduced. Therefore, it is possible to provide a vibration insulating mount 20 which prevents the abnormal sound which may be produced between the spring supporting portion 90a of the supporting ring 90 and magnetic path forming member 78B and has a stable vibration insulation control characteristic without reducing a generation force of the electromagnetic actuator 52.

Further, the contact face pressure in the stopper member 78C which comes into contact with the curved face 90b of the spring supporting portion 90a is reduced as compared to the other embodiments. Thus, the durability and wear resistance of the stopper member 78 are further improved.

The vibration insulating mount according to the respective embodiments described above are not restricted to their application to a vehicle, and the present invention can be applied to another apparatus for reducing a vibration generated by the elements other than the engine 17. Regardless of the object to which be the present invention is applied, the same operation and effect as the respective embodiments described above can be achieved. For example, the present invention can be applied to a vibration insulating mount for reducing a vibration transmitted from a machine tool to a floor or a room.

Although in the respective embodiments above, the synchronous Filtered-X LMS algorithm is used as an algorithm for generating the driving signal "y", the applicable algorithm is not restricted to this one, but for example, ordinary Filtered-X LMS algorithm or the like can be used instead.

It is needless to say that the structure of the first or the second embodiment and the third or fourth embodiment are possible to be correspondingly combined.

The entire contents of a Patent Application No. TOKUGANHEI 10-55254, with a filling date of Mar. 6, 1998 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A vibration insulating mount disposed between a vibrating body and a mounting body, comprising:

a fluid chamber filled with a fluid;

an elastic support partly defining said fluid chamber and mounting said vibrating body;

a multi-piece movable member partly defining said fluid chamber and capable of being displaced so as to change a volume of said fluid chamber, said multi-piece movable member including an inner wall forming member having an inner surface oriented toward said chamber and a separate outer magnetic path forming member which is fixed to an outer surface of the wall forming member which is oriented away from said chamber, the magnetic path forming member having a peripheral edge portion which is reduced in thickness relative to an adjacent portion of the magnetic path forming member;

a supporting member supporting said multi-piece movable member; and an actuator opposed to the magnetic path forming member of said movable member which selectively generates a displacing force to displace said movable member with respect to said chamber.

2. A vibration insulating mount according to claim 1, wherein said supporting member includes:

a retainer disposed between said elastic support and said actuator, and a resilient member disposed between and sealingly connected with the inner wall forming member of said movable member and said retainer.

3. A vibration insulating mount according to claim 1, wherein the peripheral edge portion has a step shape.

4. A vibration insulating mount according to claim 1, wherein the peripheral edge portion has a curved shape.

5. A vibration insulating mount according to claim 2, wherein a stopper member is provided on the peripheral edge portion.

6. A vibration insulating mount according to claim 5, wherein said stopper member is formed of a resilient rubber-like elastic body.

7. A vibration insulating mount according to claim 5, wherein said movable member has a constricted space portion and wherein said resilient member extends into the constricted space portion between the inner wall forming member and the magnetic path forming member so as to resiliently support said movable member between said chamber and said actuator.

8. A vibration insulating mount disposed between a vibrating body and a mounting body, comprising:

a fluid chamber filled with a fluid;

an elastic support partly defining said fluid chamber and mounting said vibrating body;

a movable member partly defining said fluid chamber and capable of being displaced so as to change a volume of said fluid chamber;

a supporting member supporting said movable member;

an actuator opposed to said movable member and generating a displacing force to displace said movable member;

a retainer disposed between said elastic support and said actuator;

a resilient member disposed between said movable member and said retainer; and a stopper member provided on an outer portion of said movable member;

wherein thickness of an outer portion of said movable member is thinner than that of an inner portion of said movable member;

wherein said movable member has a constricted portion, wherein said resilient member supports said movable member in the constricted portion, and wherein a minimum distance between a surface of said resilient member opposed to said actuator and a surface of said constricted portion opposed to said elastic support is larger than a distance between said retainer and said stopper member.

9. A vibration insulating mount mount disposed between a vibrating body and a mounting body, comprising:

a fluid chamber filled with a fluid;

an elastic support Partly defining said fluid chamber and mounting said vibrating body;

a movable member Partly defining said fluid chamber and capable of being displaced so as to change a volume of said fluid chamber;

a supporting member supporting said movable member;

an actuator opposed to said movable member and generating a displacing force to displace said movable member;

a retainer disposed between said elastic support and said actuator;

a resilient member disposed between said movable member and said retainer; and a stopper member provided on an outer portion of said movable member;

wherein thickness of an outer portion of said movable member is thinner than that of an inner portion of said movable member; and wherein said actuator is spaced opposite to said movable member so as to establish a predetermined gap and wherein said predetermined gap between said movable member and said actuator is larger than a distance between said stopper member and said actuator.

10. A vibration insulating mount according to claim 2, wherein said retainer supports said resilient member on a surface opposed to said elastic support and wherein said retainer has an inclined face formed in a surface thereof opposed to said actuator.

11. A vibration insulating mount according to claim 2, wherein said retainer supports said resilient member on a surface opposed to said elastic support and wherein said retainer has a curved face at a surface thereof opposed to said actuator.

* * * * *